United States Patent
Higashida et al.

(10) Patent No.: US 8,414,960 B2
(45) Date of Patent: Apr. 9, 2013

(54) INK COMPOSITION FOR ORGANIC ELECTROLUMINESCENT DEVICE AND PRODUCTION METHOD THEREOF

(75) Inventors: Takaaki Higashida, Osaka (JP); Kazuhiro Nishikawa, Osaka (JP)

(73) Assignee: Panasonic Corporation, Osaka (JP)

( * ) Notice: Subject to any disclaimer, the term of this patent is extended or adjusted under 35 U.S.C. 154(b) by 719 days.

(21) Appl. No.: 12/412,418

(22) Filed: Mar. 27, 2009

(65) Prior Publication Data

US 2009/0246356 A1      Oct. 1, 2009

(30) Foreign Application Priority Data

Mar. 31, 2008   (JP) .................................. 2008-092385

(51) Int. Cl.
   *B05D 5/06*          (2006.01)
(52) U.S. Cl.
   USPC ............ 427/66; 427/447; 427/485; 427/525; 427/544; 427/202; 427/203; 427/123; 427/357; 427/358; 427/376.6; 427/380; 427/384; 427/404; 427/405; 427/409; 427/419.1; 427/427.4; 427/427.5; 427/427.6; 427/427.7
(58) Field of Classification Search ............ 264/21, 264/447, 485, 525, 544, 66, 202, 203, 123, 264/357, 358, 376.6, 380, 384, 404, 405, 264/409, 419.1, 419.5, 427.4, 427.5, 427.6, 264/427.7; 427/66, 64; 349/69; 345/36, 345/45, 76; 216/5; 438/29, 69
See application file for complete search history.

(56) References Cited

U.S. PATENT DOCUMENTS

| | | | | |
|---|---|---|---|---|
| 4,012,450 | A | * | 3/1977 | Bond ............................ 568/454 |
| 5,100,759 | A | * | 3/1992 | Sato et al. ..................... 430/203 |
| 7,097,919 | B2 | | 8/2006 | Suzuki |
| 2003/0206332 | A1 | | 11/2003 | Yamazaki et al. |
| 2005/0170208 | A1 | | 8/2005 | Yatsunami et al. |
| 2005/0186445 | A1 | * | 8/2005 | Zheng et al. .................. 428/690 |
| 2006/0182993 | A1 | | 8/2006 | Ogata et al. |
| 2007/0241665 | A1 | | 10/2007 | Sakanoue et al. |
| 2007/0290604 | A1 | | 12/2007 | Sakanoue et al. |

FOREIGN PATENT DOCUMENTS

JP          10-012377 A      1/1998
(Continued)

OTHER PUBLICATIONS

Japanese Office Action dated Apr. 20, 2010 that issued with respect to patent family member Japanese Patent Application No. 2008-092385.
English language Abstract of JP 10-012377 A (Jan. 16, 1998).

(Continued)

*Primary Examiner* — Jeffrey Wollschlager
*Assistant Examiner* — Stella Yi
(74) *Attorney, Agent, or Firm* — Greenblum & Bernstein, P.L.C.

(57) ABSTRACT

A production method of an ink composition for organic EL devices comprises preparing a composition containing a polymer organic EL material and an organic solvent; and applying an electric field to the composition. Preferably, a composition containing a polymer organic EL material prepared by a coupling reaction between a halogenated aromatic compound and an aromatic boron compound in the presence of palladium catalyst or nickel catalyst, an organic solvent, and an aromatic carboxylic acid contained in an amount of 0.01-1 wt % based on the total amount of the organic solvent and aromatic carboxylic acid is prepared.

8 Claims, 1 Drawing Sheet

FOREIGN PATENT DOCUMENTS

| | | |
|---|---|---|
| JP | 2001-345174 | 12/2001 |
| JP | 2003-238666 A | 8/2003 |
| JP | 2004-115587 A | 4/2004 |
| JP | 2005-093427 | 4/2005 |
| JP | 2007-126533 | 5/2007 |

OTHER PUBLICATIONS

English language Abstract of JP 2004-115587 A (Apr. 15, 2004).
English language Abstract of JP 2003-238666 A (Aug. 27, 2003).

* cited by examiner

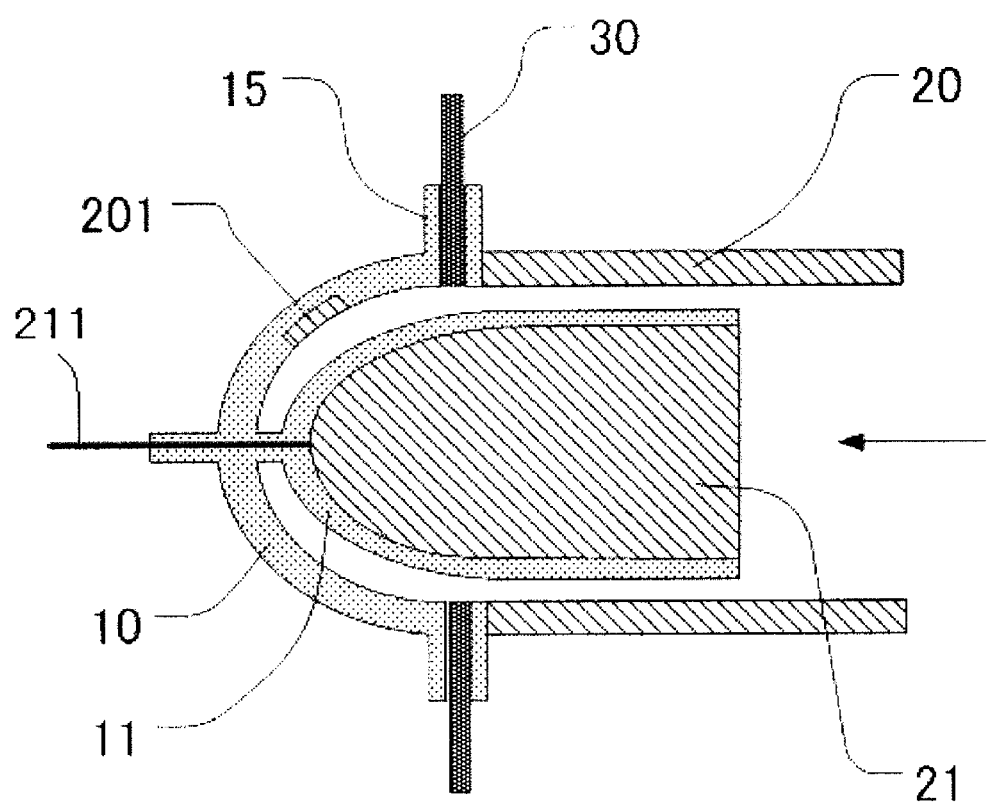

INK COMPOSITION FOR ORGANIC ELECTROLUMINESCENT DEVICE AND PRODUCTION METHOD THEREOF

CROSS REFERENCE TO RELATED APPLICATION

The disclosure of Japanese Patent Application No. 2008-092385 filed on Mar. 31, 2008 including the specification, drawing and abstract is incorporated herein by reference in its entirety.

BACKGROUND OF THE INVENTION

1. Field of the Invention

The present invention relates to an ink composition for organic electroluminescent (EL) devices, more particularly to an ink composition for forming an emitting layer of organic EL devices by coating, and to a production method thereof.

2. Description of the Related Art

Organic EL devices can be broadly classified into high-molecular type and low-molecular type according to the material of their emitting layer. While low-molecular organic emitting layers are often formed by vapor deposition, high-molecular or polymer organic emitting layers are often formed by application of inks containing polymer organic EL materials (see Japanese Patent Application Laid-Open No. 10-012377, for example).

Polymer organic EL materials prepared by palladium- or nickel-catalyzed coupling of aromatic compounds are known (see Japanese Patent Application Laid-Open No. 2004-115587, for example). As available coupling reactions, for example, Suzuki coupling reaction and Yamamoto coupling reaction are known. Moreover, polymer organic EL materials prepared by polymerization of aryl magnesium halides by Grignard reaction are also known (see Japanese Patent Application Laid-Open No. 2003-238666, for example).

Organic EL devices with an emitting layer composed of the above polymer organic EL material, however, have met with problems of reduced brightness during initial operation, shorter lifetime, etc., under certain circumstances.

It is therefore required for polymer organic EL materials to prevent brightness reduction that occurs during initial operation of organic EL devices and to increase their lifetime; however, this objective has not yet been achieved. In view of this situation it is an object of the present invention to provide an emitting material for long-life, polymer organic EL devices in which brightness reduction during initial operation is small.

The inventors investigated the cause of the brightness reduction and shorter lifetime of an organic EL device having an emitting layer composed of polymer organic EL material. As a result, they discovered that impurities in polymer organic EL materials, such as metals, halogens and low-molecular organic components, are responsible for the reduction in the brightness and lifetime. In particular, in the case where an organic EL device includes an emitting layer composed of polymer organic EL material containing alkoxy groups at the polymer chain terminals, they discovered that alkoxy group-containing active species are liberated upon exposure to an electric field and reduce brightness and lifetime. Based on these discoveries they established that the foregoing problems can be overcome by previously releasing the impurities in the ink composition and removing them.

Specifically, the foregoing problems can be solved by the following means.

[1] A production method of an ink composition for organic EL devices including:
preparing a composition containing a polymer organic EL material and an organic solvent; and
applying an electric field to the composition.

[2] The method according to [1], wherein the composition contains: a polymer organic EL material prepared by a coupling reaction between a halogenated aromatic compound and an aromatic boron compound in the presence of palladium catalyst or nickel catalyst; an organic solvent; and an aromatic carboxylic acid, and wherein the aromatic carboxylic acid is contained in an amount of 0.01-1 wt % based on the total amount of the organic solvent and the aromatic carboxylic acid.

[3] The method according to [1] or [2], wherein the intensity of the electric field is 3-10 kV/mm.

[4] The method according to any one of [1] to [3], wherein the polymer organic EL material is a polymer material containing a repeating unit having the following General Formula (a1).

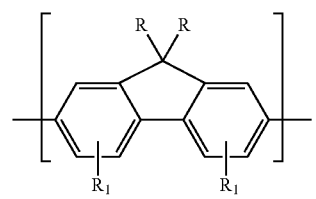

General Formula (a1)

where R denotes a hydrogen atom or alkyl group having 1-4 carbon atoms, and $R_1$ denotes a hydrogen atom, alkyl group having 1-4 carbon atoms, aryl group, or alkylaryl group.

[5] The method according to any one of [2] to [4], wherein the aromatic carboxylic acid is a compound having the following General formula (c10) or General Formula (c11).

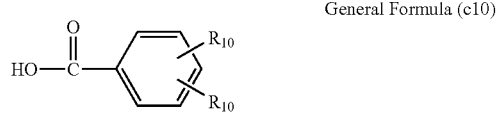

General Formula (c10)

where $R_{10}$s independently denote a hydrogen atom, alkyl group having 1-12 carbon atoms, alkoxy group having 1-12 carbon atoms, alkoxyalkyl group having 1-12 carbon atoms, or 5- to 7-membered heterocyclic ring.

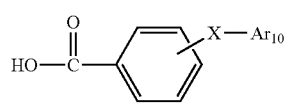

General Formula (c11)

where $Ar_{10}$ denotes an aryl group or alkylaryl group, and X denotes a single bond, alkylene group having 1-3 carbon atoms, or —$CH_2$—O—$CH_2$—.

[6] The method according to anyone of [2] to [5], wherein the aromatic carboxylic acid has a boiling point of 200-270° C.

[7] An ink composition for organic EL devices including:
a polymer organic EL material prepared by a coupling reaction between a halogenated aromatic compound and an aromatic boron compound in the presence of palladium catalyst or nickel catalyst;
an organic solvent;

an aromatic carboxylic acid; and
an ester derivative of the aromatic carboxylic acid,
wherein the aromatic carboxylic acid and the ester derivative are contained in an amount of 0.01-1 wt % based on the total amount of the organic solvent, the aromatic carboxylic acid and the ester derivative.

[8] A manufacturing method of an organic EL device including:
applying an ink composition containing a polymer organic EL material on a pixel electrode or either a hole injection/transport layer or an intermediate layer deposited on the pixel electrode; and
drying the ink composition applied,
wherein the ink composition is an ink composition for organic EL devices which is produced by the method according to any one of [1] to [6].

[9] A manufacturing method of an organic EL device including:
applying the ink composition according to [7] on a pixel electrode or either a hole injection/transport layer or an intermediate layer deposited on the pixel electrode; and
drying the ink composition applied.

The present invention can provide a long-life polymer organic EL material in which brightness reduction during initial operation is small.

BRIEF DESCRIPTION OF THE DRAWING

FIG. 1 is a cross sectional view of an example of a device for applying an electric field to an ink composition according to an embodiment of the present invention.

DETAILED DESCRIPTION OF THE PREFERRED EMBODIMENT

1. Method of Producing Ink Composition for Organic EL Device

An ink composition for organic EL devices (hereinafter may be simply referred to as "ink composition") is a composition from which an emitting layer of an organic EL device is formed by coating. More specifically, ink compositions are applied over regions defined by banks (also referred to as "barriers") and dried to form organic EL devices. As used herein, a layer of ink composition just applied and not yet dried may be referred to as an "applied coat," and a layer of ink composition obtained by drying the applied coat may be referred to as a "dried coat."

A method of the present invention for producing an ink composition includes the steps of (1) preparing a composition containing a polymer organic EL material and an organic solvent, and (2) applying an electric field to the composition prepared.

Preferably, the step (1) prepares a composition containing:
(A') a polymer organic EL material prepared by a coupling reaction between a halogenated aromatic compound and an aromatic boron compound in the presence of palladium catalyst or nickel catalyst; (B) an organic solvent; and (C) an aromatic carboxylic acid in an amount of 0.01-1 wt % based on the total amount of the organic solvent and aromatic carboxylic acid.

From the ink composition produced in this way, as will be described later, metals, active species containing alkoxy groups derived from the polymer chain terminals of the polymer organic EL material obtained by a coupling reaction (hereinafter also referred to as "coupling-based polymer material"), etc. are more likely to be removed. Accordingly, in organic emitting layers obtained from the ink composition, reductions in the brightness during initial operation and lifetime are suppressed.

Step (1)

In this step, for example, a polymer organic EL material and, preferably an aromatic carboxylic acid, are dissolved in an organic solvent. The dissolving condition is not specifically limited; however, heat may be applied as needed.

(A) Polymer Organic EL Material

Polymer organic EL materials refer to polymer materials with light-emitting property. Polymer organic EL materials used in the present invention preferably have semiconductor characteristics.

Among other such polymer organic EL materials, polymer organic EL materials used in the present invention are preferably those prepared by a coupling reaction between halogenated aromatic compounds and aromatic boron compounds in the presence of palladium catalyst or nickel catalyst (i.e., coupling-based polymer materials) and polymer materials prepared by Grignard reaction (hereinafter also referred to as "Grignard-based polymer materials").

(1) Coupling-Based Polymer Material

Coupling-based polymer materials can be obtained by the so-called Suzuki coupling reaction or Yamamoto coupling reaction. Such coupling-based polymer materials may have alkoxy groups at the terminals.

The following shows a scheme by which a halogenated benzene and phenylboronic acid undergo a coupling reaction in the presence of palladium catalyst. In this reaction, intermediates (i) and (ii) are reacted to produce intermediate (iii), followed by production of a coupled product (biphenyl in this example). In this scheme "R" denotes an alkyl group such as methyl group, "Y" denotes hydroxyl group, and "X" denotes a halogen atom. In this reaction, Pd is reductively released from intermediate (i) to produce an alkoxy aromatic compound. There is a possibility that such a coupling reaction occurs upon synthesis of a coupling-based polymer material. Therefore, it is believed that the polymer materials having alkoxy groups at the terminals are also synthesized by this reaction.

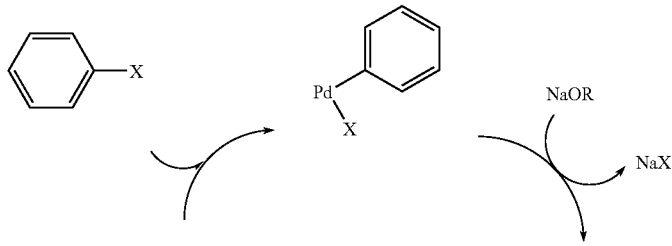

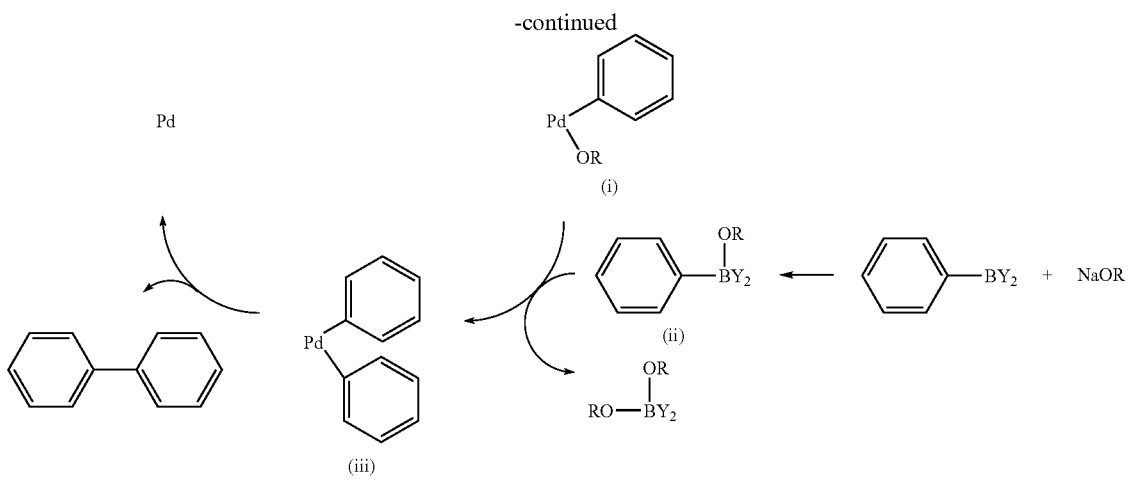

Examples of halogenated aromatic compounds for the coupling reaction include fluorene halides. Examples of aromatic boron compounds for the coupling reaction include aromatic boronic acids. Regarding the palladium catalyst and nickel catalyst, preferably, the valence of palladium and valence of nickel are both zero. In the coupling reaction, metal alkoxylates are also used. As the metal alkoxylate, sodium methoxylate and potassium methoxylate are often used. Consequently, coupling-based polymer materials often contain methoxy groups at the terminals. Moreover, coupling-based polymer materials may contain metals such as sodium or potassium.

In the present invention, coupling-based polymer materials are preferably polyfluorene-based polymer organic EL materials, which are polymer materials containing a repeating unit having the following General Formula (a1), i.e., fluorenylene.

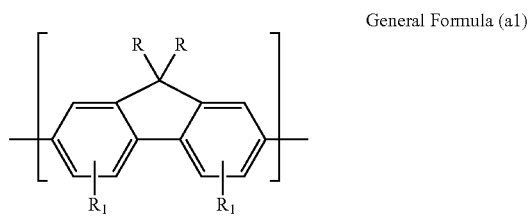

General Formula (a1)

where R denotes a hydrogen atom or alkyl group having 1-4 carbon atoms, and $R_1$ denotes a hydrogen atom, alkyl group having 1-4 carbon atoms, aryl group, or alkylaryl group.

The polymer chain terminals of polymer materials are generally susceptible to decomposition upon, for example, exposure to an electric field or heat. In particular, polymer materials that contain active organic groups (e.g., alkoxy groups) at the polymer chain terminals, such as coupling-based polymer materials, are believed to be significantly susceptible to terminal decomposition. Alkoxy group-containing active species generated by application of an electric field to an organic EL device are released in the emitting layer and reduce the lifetime and brightness of the organic EL device during initial operation. These alkoxy group-containing active species are considered to be alkoxy ions.

Moreover, when an electrical field is applied, metals contained in the coupling-based polymer material are ionized and released in the emitting layer. These metals also reduce the lifetime and brightness of an organic EL device during initial operation.

To overcome these problems, following the step (1), an electric field is applied to the composition containing the coupling-based polymer material, so that alkoxy groups attached to the polymer chain terminals are liberated. These active species are then reacted with an aromatic carboxylic acid to produce an ester of the aromatic carboxylic acid. The aromatic carboxylic acid ester is contained in the ink composition together with a non-esterified aromatic carboxylic acid; they are vaporized away upon drying of the ink composition applied. At this time, metals contained in the coupling-based polymer material are ionized and liberated. The metal ions are trapped by a cathode, which is provided for applying an electric field, for removal from the ink composition.

(2) Grignard-Based Polymer Material

Grignard-based polymer materials may contain halogens (e.g., Br) and/or metals (e.g., Mg) because a Grignard reagent is used for synthesis. These halogens and metals are ionized upon exposure to an electric field and are released in the emitting layer, reducing the lifetime and brightness of the organic EL device during initial operation.

As described above, following the step (1), the present invention includes the step of applying an electric field to the composition containing a Grignard-based polymer material, so that metals and the like contained in the Grignard-based polymer material can be removed.

(B) Organic Solvent

It is only necessary for organic solvents used in the present invention to be organic solvents generally used for preparation of ink compositions for organic EL devices. Examples of the organic solvents include aromatic organic solvents such as toluene, xylene, tetralin and anisole; ether solvents such as dioxane; and alcohol solvents such as isopropylalcohol.

The amount of organic solvent to be added is so selected that the ink composition's viscosity and concentration of the polymer organic EL material are set to desired values. The ink composition preferably has a viscosity of 10-30 mPa·s. The concentration of the polymer organic EL material in the ink composition is preferably 0.5-10 wt %, more preferably 1-4 wt %. Note in the present invention that hyphens are used to indicate a range of inclusive numbers.

More preferably, the organic solvent used in the present invention contain a solvent having a molecular weight of 150 or more and a dipole value of 2D or less (hereinafter also referred to as a "specific solvent"). Since the molecular weight is 150 or more, the specific solvent generally has a boiling point of above certain level or volatility of below certain level. For this reason, the applied coat formed of the ink composition never dries up rapidly and thus uneven drying can be prevented. When drying unevenness is small, it results in a dried coat of uniform thickness and there by an emitting layer with small light-emitting unevenness can be obtained. The molecular weight of the specific solvent is preferably 300 or less. This is because too large a molecular weight may make the removal of the organic solvent from the coating solution difficult.

The specific solvent has a dipole value of 2D or less and therefore does not excessively interacts with polymer organic EL materials. Thus, the specific solvent may be removed from the applied coat by drying with reliability. Note, however, that excessively small dipole values (e.g., less than 0.5D) may extremely reduce the solubility of polymer organic EL materials. Accordingly, the dipole value of the specific solvent is preferably 0.5D or more.

Examples of solvents having a molecular weight of 150 or more and a dipole value of 2D or less include, but not limited to, phenoxytoluene (molecular weight: 184, dipole value: 1.10D), cyclohexylbenzene (molecular weight: 160, dipole value: 0.22D), dipentylbenzene (molecular weight: 218, dipole value: not greater than 2D), octylbenzene (molecular weight: 190, dipole value: not greater than 2D), ethylbiphenyl (molecular weight: 182, dipole value: not greater than 2D), and phenyldioxane (molecular weight: 164, dipole value: not greater than 2D).

(C) Aromatic Carboxylic Acid

Aromatic carboxylic acids refer to compounds in which a carboxyl group is introduced to an aromatic ring. In the present invention, it is preferable to use aromatic carboxylic acids having General Formula (c10) or (c11)

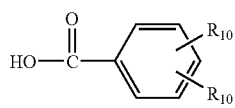

General Formula (c10)

where $R_{10}$s independently denote a hydrogen atom, alkyl group having 1-12 carbon atoms, alkoxy group having 1-12 carbon atoms, alkoxyalkyl group having 1-12 carbon atoms, or 5- to 7-membered heterocyclic ring. As used herein, "independently" indicates that $R_{10}$s may be identical or different. Preferably, $R_{10}$s independently denote an alkyl group having 4-6 carbon atoms, alkoxy group having 1-4 carbon atoms, alkoxyalkyl group having 1-3 carbon atoms, or 6-membered heterocyclic ring. Specific examples of the aromatic carboxylic acids include compounds shown below. In these compounds, substituents (e.g., alkyl group) can be attached to any substitution position.

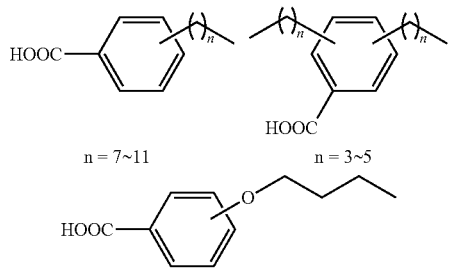

n = 7~11    n = 3~5

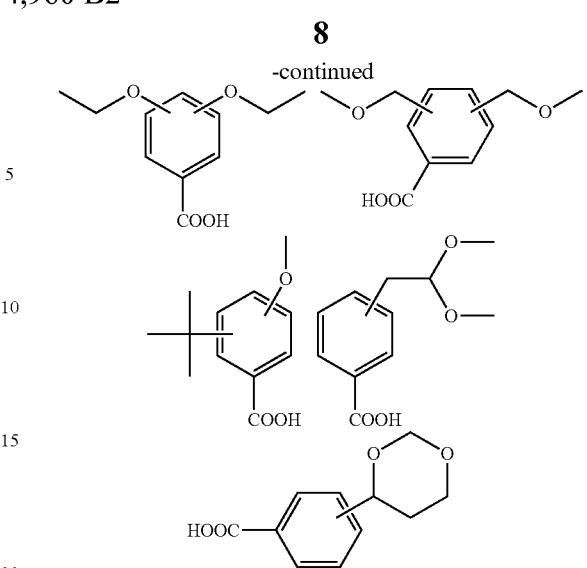

The other set of aromatic carboxyl acids preferably used in the present invention includes compounds having General Formula (c11).

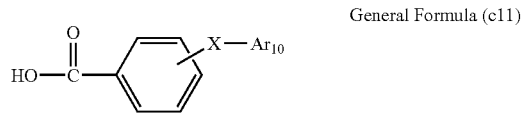

General Formula (c11)

where $Ar_{10}$ denotes an aryl group or alkylaryl group, with phenyl group or phenyl group in which an alkyl group having 1-3 carbon atoms is introduced being preferable; and X denotes a single bond, alkylene group having 1-3 carbon atoms, or —$CH_2$—O—$CH_2$—. Specific examples of the aromatic carboxylic acids include compounds having the following formulas. In these formulas, substituents (e.g., aryl group and aralkyl group) can be attached to any substitution position.

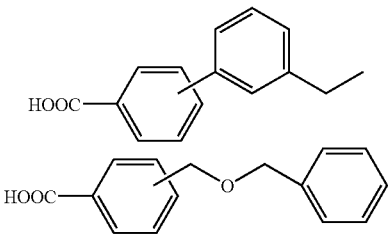

As shown above, aromatic carboxylic acids used in the present invention have substituents that are relatively hydrophobic. Polymer organic EL materials are generally hydrophobic and thus are compatible with these aromatic carboxylic acids. For this reason, when formulated into ink compositions, the aromatic carboxylic acids are less likely to cause troubles such as precipitation.

On the other hand, if an aromatic carboxyl acid is excessively compatible with a polymer organic EL material, it is sometimes difficult to remove the aromatic carboxylic acid from the applied coat in the step of applying and drying the ink composition. For this reason, the solubility parameter of the aromatic carboxylic acid in the ink composition is preferably 8-10 $(cal/cm^3)^{1/2}$ Solubility parameter can be calculated based on the Fedors' method.

Moreover, the aromatic carboxylic acid preferably has a boiling point of 200-270° C. When the boiling point falls within this range, the aromatic carboxylic acid can be readily removed from the applied coat in the step of applying and drying the ink composition.

The larger the amount of an aromatic carboxylic acid added in this step, the more likely it is that alkoxy group-containing active species liberated from the polymer chain terminals of a coupling-based polymer material are reacted with that aromatic carboxylic acid in the subsequent step. However, if the aromatic carboxylic acid content is too high, it becomes difficult to remove the aromatic carboxylic acid from the applied coat prepared by applying the ink composition. To better balance reactivity and removability, the aromatic carboxylic acid content is preferably 0.01-1 wt % based on the total amount of the organic solvent and aromatic carboxylic acid.

Step (2)

In this step, an electric field is applied to the composition prepared in the previous step. The intensity of the electric field is preferably 3-10 kV/mm. If the electric field intensity exceeds the upper limit, the polymer organic EL material may be degraded. On the other hand, if the electric field intensity is less than the lower limit, the effect of removing metals and the like from the polymer organic EL material may be insufficient. Furthermore, if the electric field intensity is less than the lower limit in the case of a coupling-based polymer material, the effect of liberating alkoxy group-containing active species from the polymer chain terminals may be insufficient.

Hereinafter the step (2) will be explained by taking as an example a case where an electric field is applied to a composition containing a coupling-based polymer material, organic solvent and aromatic carboxylic acid. In this case, it is preferable to use, for example, a device shown in FIG. 1. FIG. 1 is a cross-sectional view of an example of a device for applying an electric field to a composition. In this drawing reference numeral 10 denotes an outer wall; 11 denotes an inner wall; 15 denotes a composition discharge port; 20 and 201 denote an electrode attached to outer wall 10; 21 denotes an electrode attached to inner wall 11; 211 denotes a conductor; and 30 denotes a valve for discharging composition. The arrow indicates the flow direction of the composition. A voltage is applied between electrodes 20 and 21 for applying an electric field to the composition (power supply is not shown).

An ink composition is introduced in the device of FIG. 1 from the right side in the drawing and is transferred to its tip portion. The ink composition is sandwiched between outer wall 10 and inner wall 11, and an electric field is applied to the composition. This causes the above-described reaction to produce an aromatic carboxylic acid ester. This reaction can be monitored by the voltage changes between electrodes 201 and 21. After confirming that the reaction has fully proceeded, valve 30 is opened to discharge the composition from discharge port 15.

The distance (gap) between outer wall 10 and inner wall 11 is preferably 0.5-2 mm. Moreover, outer wall 10 and inner wall 11 are preferably made of glass. In particular, outer wall 10 and inner wall 11 are preferably made of alkali-free glass because no alkali metals (e.g., Na and Ca) are eluted when an electric field is applied. When an organic EL device contains such alkali metals, it may result in poor light-emission characteristics. Examples of alkali-free glass include silica glass.

When this device is used, the average flow rate of the composition as measured from introduction to discharge is preferably around 1 m/min.

In this step when a positive charge and a negative charge are applied to electrodes 21 and 20, respectively, metal ions such as sodium ion and potassium ion in the composition can be trapped onto inner wall 11. When anions are abundantly contained in the composition, they can also be trapped onto inner wall 11 by applying a positive charge to electrode 20 and a negative charge to electrode 21.

2. Ink Composition for Organic EL Device

An ink composition of the present invention contains a polymer organic EL material, an organic solvent, and an aromatic carboxylic acid and an ester derivative thereof, the polymer organic EL material prepared by a coupling reaction between a halogenated aromatic compound and an aromatic boron compound in the presence of palladium catalyst or nickel catalyst. The total amount of the aromatic carboxylic acid and ester derivative thereof is preferably 0.01-1 wt % based on the total amount of the organic solvent, aromatic carboxylic acid and ester derivative thereof. This ink composition can be produced for instance by the above-described method. In spite of the fact that the polymer organic EL material contained in the ink composition produced as described above is a coupling-based polymer material, most of the metals and alkoxy groups derived from the polymer chain terminals are removed.

The aromatic carboxylic acid ester contained in the ink composition is preferably a product obtained by reaction of the aromatic carboxylic acid with the alkoxy group derived from the polymer chain terminal of the coupling-based polymer material. In this case "the total amount of the aromatic carboxylic acid and ester thereof" is preferably 0.01-1 wt % based on "the total amount of the organic solvent, and aromatic carboxylic acid and ester thereof." From this ink composition, the aromatic carboxylic acid and ester thereof can be readily removed in the above-described step of drying the applied coat. As a consequence, in the organic emitting layer composed of the ink composition of the present invention, reduction in the brightness during initial operation, and reduction in the lifetime can be suppressed.

The ink composition of the present invention may be an ink composition containing a Grignard-based polymer material and an organic solvent. This ink composition can be produced for instance by the above-described method. From the ink composition produced in this way, most of the metals and the like derived from the Grignard polymer material are removed.

3. Manufacturing Method of Organic EL Device

The ink composition of the present invention is used for the formation of the emitting layer of an organic EL device by coating. The production method of the present invention preferably includes the steps of (1) preparing an ink composition for an organic EL device, (2) applying the ink composition on pixel electrodes or either hole injection/transport layers or intermediate layers deposited on the pixel electrodes, and (3) drying the ink composition applied. The ink composition is preferably the one produced by the above-described method.

Means of applying the ink composition is not specifically limited; inkjet method, dispensing, die coating, gravure printing, offset printing, etc. can be employed. The region to be coated with the ink composition may be defined by banks (barriers).

The pixel electrode refers to an electrode (anode) constituting a pixel. The hole injection/transport layer refers to a layer that is provided in order to reduce the carrier injection barrier and to stabilize interaction between the electrode and organic emitting layer. The intermediate layer refers to a layer that is provided in order to prevent chemical reactions between the organic emitting layer and hole transport/injectio layer. The pixel electrode, hole transport/injection layer and intermediate layer may be formed of any known material.

Drying is preferably performed under reduced pressure; it is often performed under a pressure of $10^{-4}$-10 Pa. Drying temperature is preferably set to 40-110° C. Drying time is preferably set to 20-60 minutes. The emitting layer produced by drying the ink composition may be annealed.

The total amount of the organic solvent, active species derived from the polymer organic EL material, and carboxylic acid and ester thereof is preferably 100 ppm or less.

Using the ink composition of the present invention, it is possible to manufacture a long-life organic EL device in which brightness reduction during initial operation is small.

What is claimed is:

1. An ink for organic EL devices comprising:
    a polymer organic EL material prepared by a coupling reaction between a halogenated aromatic compound and an aromatic boron compound in the presence of a palladium catalyst or a nickel catalyst;
    an organic solvent;
    an aromatic carboxylic acid having a boiling point of 200-270° C.; and
    an ester derivative of the aromatic carboxylic acid,
    wherein the aromatic carboxylic acid and the ester derivative are contained in an amount of 0.01-1 wt % based on the total amount of the organic solvent, the aromatic carboxylic acid and the ester derivative.

2. A manufacturing method of an organic EL device comprising:
    applying the ink according to claim 1 on a pixel electrode or either a hole injection/transport layer or an intermediate layer deposited on the pixel electrode; and
    drying the ink applied.

3. A manufacturing method of an organic EL device comprising: preparing an ink by applying an electric field to a composition containing
    i. a polymer organic EL material prepared by a coupling reaction between a halogenated aromatic compound and an aromatic boron compound in the presence of a palladium catalyst or a nickel catalyst;
    ii. an organic solvent; and
    iii. an aromatic carboxylic acid, the aromatic carboxylic acid being contained in an amount of 0.01-1 wt % based on the total amount of the organic solvent and the aromatic carboxylic acid
in a container equipped with a pair of electrodes;
    applying the prepared ink with an applicator on a pixel electrode or either a hole injection/transport layer or an intermediate layer deposited on the pixel electrode; and
    drying the applied ink.

4. The method according to claim 3, wherein the intensity of the electric field is 3-10 kV/mm.

5. The method according to claim 3, wherein the polymer organic EL material is a polymer material containing a repeating unit having the following General Formula (a1):

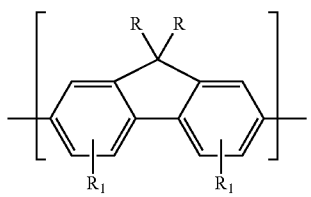

General Formula (a1)

where R denotes a hydrogen atom or an alkyl group having 1-4 carbon atoms, and $R_1$ denotes a hydrogen atom, an alkyl group having 1-4 carbon atoms, an aryl group, or an alkylaryl group.

6. The method according to claim 3, wherein the aromatic carboxylic acid is a compound having the following General Formula (c10) or General Formula (c11):

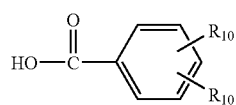

General Formula (c10)

where $R_{10}$s independently denote a hydrogen atom, an alkyl group having 1-12 carbon atoms, an alkoxy group having 1-12 carbon atoms, alkoxyalkyl group having 1-12 carbon atoms, or a 5- to 7-membered heterocyclic ring;

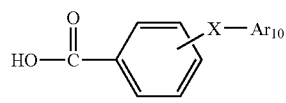

General Formula (c11)

where $Ar_{10}$ denotes an aryl group or an alkylaryl group, and X denotes a single bond, an alkylene group having 1-3 carbon atoms, or —$CH_2$—O—$CH_2$—.

7. The method according to claim 3, wherein the aromatic carboxylic acid has a boiling point of 200-270° C.

8. The method according to claim 3, further comprising loading the prepared ink in the applicator prior to applying the prepared ink.

* * * * *